United States Patent
Truong et al.

(10) Patent No.: US 11,234,504 B2
(45) Date of Patent: Feb. 1, 2022

(54) SYSTEMS AND COSMETIC KITS FOR REMOVING MAKEUP FROM A REGION OF AN EYE

(71) Applicant: L'Oreal, Paris (FR)

(72) Inventors: Lily Truong, Redmond, WA (US);
Zane Miller, Redmond, WA (US);
Gloria Morales, Redmond, WA (US)

(73) Assignee: L'OREAL, Paris (FR)

( * ) Notice: Subject to any disclaimer, the term of this patent is extended or adjusted under 35 U.S.C. 154(b) by 414 days.

(21) Appl. No.: 16/221,140

(22) Filed: Dec. 14, 2018

(65) Prior Publication Data
US 2020/0187624 A1   Jun. 18, 2020

(51) Int. Cl.
| | | |
|---|---|---|
| *A45D 34/04* | (2006.01) | |
| *A46B 9/02* | (2006.01) | |
| *C09K 5/02* | (2006.01) | |
| *A61Q 1/14* | (2006.01) | |

(52) U.S. Cl.
CPC ............ *A45D 34/042* (2013.01); *A46B 9/021* (2013.01); *A61Q 1/14* (2013.01); *C09K 5/02* (2013.01); *A45D 2200/1063* (2013.01); *A46B 2200/1046* (2013.01)

(58) Field of Classification Search
CPC ...... A61Q 1/14; A45D 40/267; A45D 40/262; A45D 40/24; A45D 40/265; A45D 40/268; A45D 40/28; A45D 2200/1063; A45D 34/042; A45D 34/045
See application file for complete search history.

(56) References Cited

U.S. PATENT DOCUMENTS

| | | | | |
|---|---|---|---|---|
| 3,921,650 A | * | 11/1975 | Montgomery | A45D 40/267 132/218 |
| 5,061,103 A | | 10/1991 | Walsh-Smith | |
| 5,339,841 A | * | 8/1994 | Gueret | A45D 34/042 132/218 |
| 5,509,742 A | * | 4/1996 | Balzarini | A45D 40/267 401/126 |
| 6,464,418 B1 | * | 10/2002 | Visser | A45D 33/00 206/509 |
| 6,616,366 B1 | * | 9/2003 | Weihrauch | A46B 9/021 401/286 |
| 7,992,577 B2 | * | 8/2011 | De Brouwer | A45D 40/262 132/218 |
| 8,888,392 B2 | * | 11/2014 | Pires | A45D 40/267 401/122 |

(Continued)

FOREIGN PATENT DOCUMENTS

| | | |
|---|---|---|
| CA | 2 588 310 A1 | 11/2008 |
| DE | 10 018 519 A1 | 10/2001 |

(Continued)

*Primary Examiner* — Cris L. Rodriguez
*Assistant Examiner* — Brianne E Kalach
(74) *Attorney, Agent, or Firm* — Christensen O'Connor Johnson Kindness PLLC

(57) ABSTRACT

Systems and cosmetic kits including a formulation for removing eye makeup from a region of an eye; and a brush including a plurality of bristles shaped to apply the formulation to the region of the eye are described. In an example, the system includes a formulation for removing eye makeup from a region of an eye; and a brush including a plurality of bristles shaped to apply the formulation to the region of the eye.

19 Claims, 12 Drawing Sheets

(56) References Cited

U.S. PATENT DOCUMENTS

| | | | | |
|---|---|---|---|---|
| 9,004,791 B2* | 4/2015 | Acierto | ............... | A45D 34/04 |
| | | | | 401/17 |
| 9,066,573 B2 | 6/2015 | Pires et al. | | |
| 9,526,316 B2 | 12/2016 | Pires et al. | | |
| 2003/0163884 A1* | 9/2003 | Weihrauch | ............. | A46B 9/021 |
| | | | | 15/207.2 |
| 2015/0375448 A1* | 12/2015 | Wilson | ................... | B29C 65/74 |
| | | | | 156/73.1 |
| 2017/0265620 A1* | 9/2017 | Bouix | ................... | A45D 40/18 |
| 2018/0168320 A1 | 6/2018 | Chung | | |

FOREIGN PATENT DOCUMENTS

| | | |
|---|---|---|
| EP | 0 717 944 A1 | 6/1996 |
| EP | 1 793 700 A1 | 6/2007 |
| EP | 3 288 526 A1 | 3/2018 |
| GB | 2064314 A | 6/1981 |
| GB | 8302134 | 3/1983 |
| GB | 2118436 A | 11/1983 |
| JP | 3114890 U | 10/2005 |
| JP | 4916568 B2 | 4/2012 |
| KR | 200417147 U | 5/2006 |
| KR | 200475953 U | 1/2015 |
| WO | 2007/96923 A1 | 8/2007 |

* cited by examiner

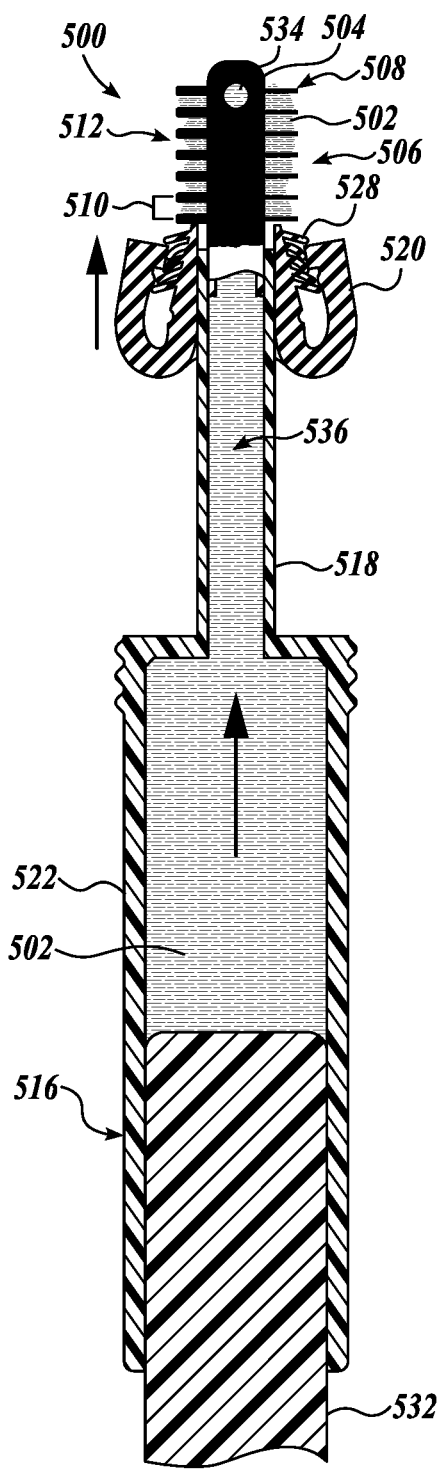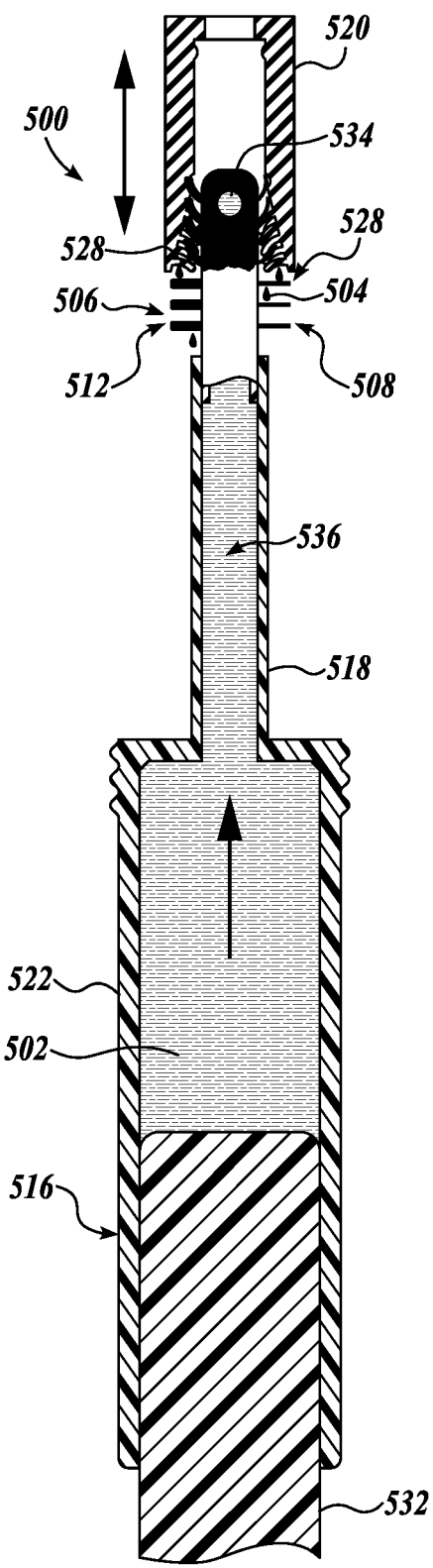
FIG. 5C  FIG. 5D

SYSTEMS AND COSMETIC KITS FOR REMOVING MAKEUP FROM A REGION OF AN EYE

SUMMARY

In one aspect, the present disclosure provides a system for eye makeup removal, the system generally including a formulation for removing eye makeup from a region of an eye; and a brush including a plurality of bristles shaped to apply the formulation to the region of the eye.

In another aspect, the present disclosure includes a cosmetic kit generally including eye makeup for application onto a region of an eye; and a system for removing the eye makeup from the region of the eye, the system including a formulation for removing the eye makeup from the region of the eye; and a brush including a plurality of bristles shaped to apply the formulation to the region of the eye.

In accordance with any of the embodiments disclosed herein, the plurality of bristles is a first plurality of bristles, the system further comprising a second plurality of bristles shaped to remove the eye makeup from the region of the eye. In accordance with any of the embodiments disclosed herein, a bristle space between two neighboring bristles of the second plurality of bristles corresponds to a lash space between eyelashes of the eye. In accordance with any of the embodiments disclosed herein, a size of the bristle space is an integer multiple of a size of the lash space. In accordance with any of the embodiments disclosed herein, the first plurality of bristles has a first stiffness and the second plurality of bristles has a second stiffness greater than the first stiffness.

In accordance with any of the embodiments disclosed herein, the plurality of bristles is optically transmissive.

In accordance with any of the embodiments disclosed herein, the formulation comprises a surfactant solution. In accordance with any of the embodiments disclosed herein, the formulation comprises a biphasic distribution of an oil and the surfactant solution.

In accordance with any of the embodiments disclosed herein, the brush generally includes a handle portion configured to be grasped by a hand; and a support member extending between the handle and the plurality of bristles. In accordance with any of the embodiments disclosed herein, the system includes a wiper slideably disposed about the support member, the wiper configured to remove eye makeup from the brush. In accordance with any of the embodiments disclosed herein, the system generally includes a wiper portion of the handle portion is slideably disposed about the support member and includes a wiper configured to remove eye makeup from the brush.

In accordance with any of the embodiments disclosed herein, the formulation is disposed in a formulation reservoir shaped to receive the brush and to cooperatively couple with the handle portion.

In accordance with any of the embodiments disclosed herein, the eye makeup comprises a phase-change material. In accordance with any of the embodiments disclosed herein, the brush further comprises a heating element adjacent to the plurality of bristles configured to heat the plurality of bristles above a phase-change temperature of the phase-change material. In accordance with any of the embodiments disclosed herein, the phase-change material is a sheer-thinning material configured to undergo phase change when contacted by the plurality of bristles.

This foregoing summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

FIGS. 5A-5D are cross-sectional views of another system, in accordance with an embodiment of the disclosure.

Figure 1A:
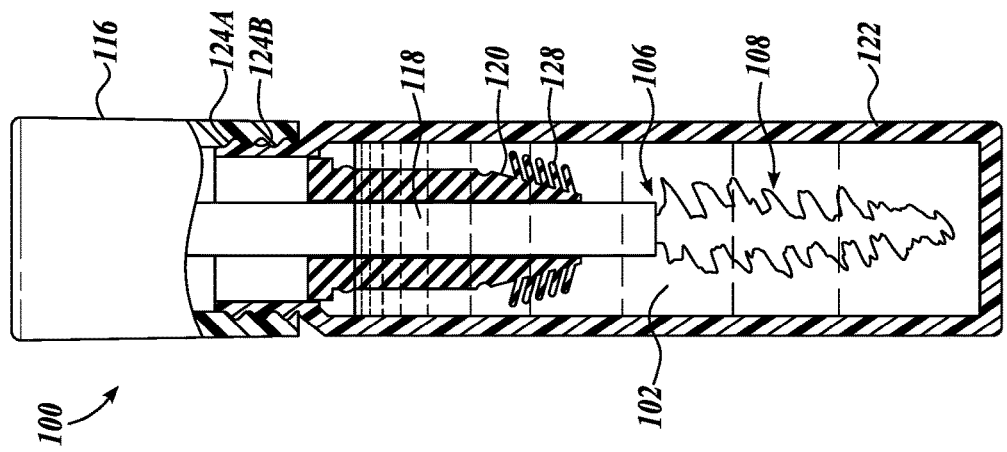
FIGS. 1A-1C are cross-sectional views of a system in accordance with an embodiment of the present technology.

Aspects and many of the attendant advantages of the claimed subject matter will become more readily appreciated as the same become better understood by reference to the following detailed description, when taken in conjunction with the accompanying drawings.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

DETAILED DESCRIPTION

The following discussion provides examples of systems and cosmetic kits for removing eye makeup from regions of an eye, such as eyelashes, eyelids, and the like. In the examples of the systems set forth below in more detail below, several are provided that include a formulation for removing eye makeup from a region of an eye and a brush having a plurality of bristles shaped to apply the formulation to the region of the eye. In the following description, numerous specific details are set forth in order to provide a thorough understanding of one or more embodiments of the present disclosure. It will be apparent to one skilled in the art, however, that many embodiments of the present disclosure may be practiced without some or all of the specific details. Further, it will be appreciated that embodiments of the present disclosure may employ any combination of features described herein.

Eye makeup, such as mascara, eye liner, brow liner, eye shadow, and the like, is conventionally removed from regions of the eye to which it has been applied with towelettes that wipe eye makeup off of the regions of the eye. Such towelettes, such as those containing an absorbed surfactant solution and/or alcohol, are not specifically structured according to corresponding structures of the eye, such as eyelashes, eyelids, and the like. Therefore, users frequently use several towelettes to remove eye makeup, and in the process frequently irritate the eyes and portions of skin surrounding and covering the eyes, such as eyelids.

Such conventional techniques also frequently result in smudging of eye makeup over the face. In this regard, users are frequently unable to remove eye makeup from the eye, particularly from roots of eyelashes even by using several towelettes.

Toward that end, the present disclosure provides systems and cosmetic kits for removing eye makeup from an eye. In some embodiments, the inventive systems and cosmetic kits include a formulation for removing eye makeup and a brush shaped to apply the formulation to the eye.

Systems for Removing Eye Makeup

In an aspect, the present disclosure provides a system for removing eye makeup. In an embodiment, the system includes a formulation for removing eye makeup and an application portion, such as a brush, shaped to apply the formulation to the eye. In an embodiment, the brush is further configured to remove the eye makeup from the region of the eye, such as by brushing the formulation, now containing the eye makeup, from the eye. As discussed further herein, the brushes of the present disclosure may also be shaped to remove eye makeup from portions of the eye, such as eyelashes and eyelids, that are difficult to reach using conventional products, such as towelettes, for removing eye makeup.

Systems Including a Brush and a Formulation

Figure 1B:
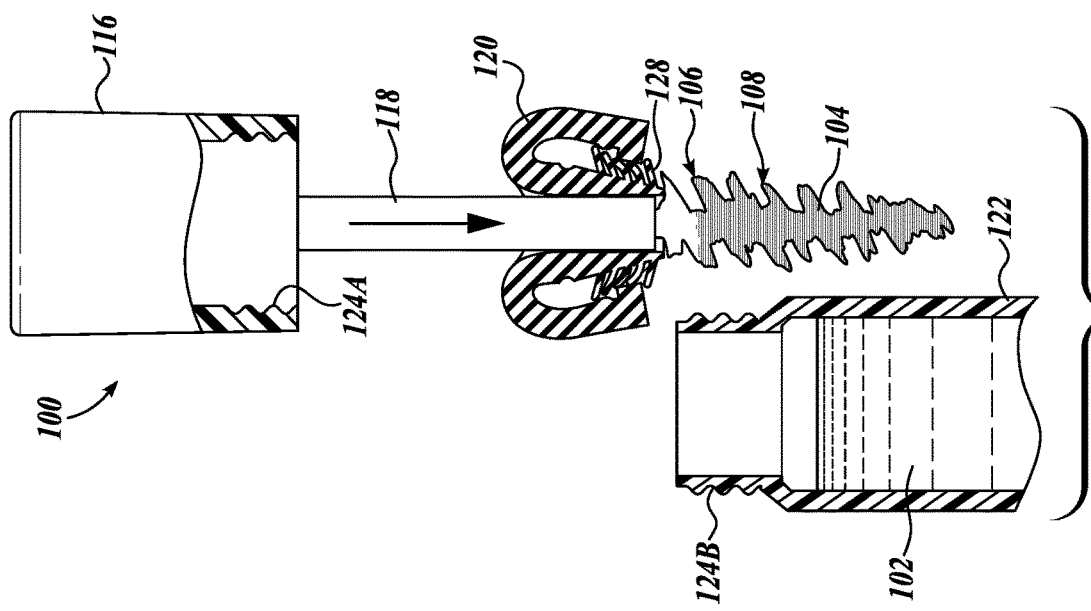
Figure 1C:
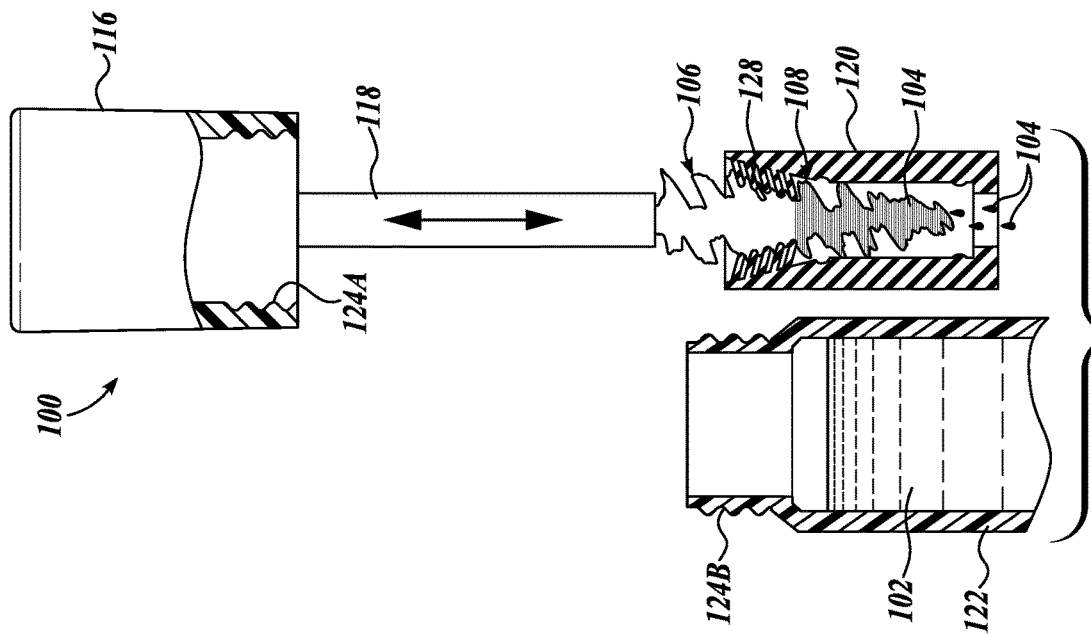

Turning now to FIGS. 1A-1C there is shown an example of a system 100, in accordance with embodiments of the disclosure. As shown, the system 100 includes a formulation 102 and a brush 106 shaped to apply the formulation 102. As discussed further herein, the formulation 102 can be a formulation 102 to remove makeup, such as eye makeup 104 from the region of the eye. The brush 106 includes a plurality of bristles 108 shaped to apply the formulation 102. In an embodiment, the formulation 102 is configured to remove eye makeup 104, such as mascara, eye liner, brow liner, eye shadow, and the like, and the brush 106 including the bristles 108 is shaped to apply the formulation 102 to a region of the eye.

In the illustrated embodiment, the brush 106 includes a handle portion 116 configured to be grasped by a hand; and a support member 118 extending between the handle portion 116 and the bristles 108. The handle portion 116 may be grasped by a hand during application of the formulation 102 to a portion of an eye, such as during application of formulation and removal of eye makeup 104. In that regard, the bristles 108 may be used to apply the formulation 102 and subsequently brush the formulation 102 and eye makeup 104 away from or off of the region of the eye.

As shown, the formulation 102 is disposed in a formulation reservoir 122. In the illustrated embodiment, the formulation reservoir 122 is shaped to receive the brush 106 and to cooperatively couple with the handle portion 116. The formulation reservoir 122 and handle portion 116 are each shown to include threads 124A and 124B, respectively, configured to cooperatively couple. While the threads 124A and 124B are illustrated, it will be understood that other cooperative coupling structures may be used to cooperatively couple brush 106 and formulation reservoir 122. Such cooperative coupling may be configured to retain the formulation 102 in the formulation reservoir 122, such as when the system 100 is not being used to remove eye makeup 104 from a region of an eye.

In an embodiment, the formulation 102 includes a surfactant solution. Such a surfactant solution may be suitable to remove, for example, mascara, eye liner, brow liner, eye shadow, and the like from a region of an eye. In an embodiment, the formulation 102 comprises a biphasic distribution of an oil and a surfactant solution. Such a biphasic distribution may be suitable to remove, for example, waterproof mascara from eyelashes of an eye. In an embodiment, the formulation 102 is a gel configured, for example, to remain on the region of the eye when applied. In this regard, the gel formulation 102 tends not to run into an eye after application to the region of the eye. In an embodiment, the formulation 102 is configured to be used on a region of the eye, such as a region adjacent to the eyeball. In this regard, the formulation 102 may be gentle enough such that it generally will not irritate the eye and surrounding skin. In an embodiment, the formulation 102 is also configured to interact with eye makeup 104, such as by dissolving or partially dissolving eye makeup 104 suitable to make the eye makeup 104 easier to remove from the portion of the body.

As above, the brush 106 includes a plurality of bristles 108. In an embodiment, the bristles 108 have a color different from a color of eye makeup 104. In that regard, in an embodiment, the bristles 108 are white or have another light color. In another embodiment, the bristles 108 are optically transmissive. Eye makeup 104, such as mascara and eyeliner, is generally dark. Accordingly, as the formulation 102 is applied and then wiped off of the region of the eye with the brush 106, the bristles 108 may accumulate eye makeup 104. With the bristles 108 having a different color than the eye makeup 104, they are suitable to provide a contrast between a clean brush 106, as shown in FIG. 1A, and the brush 106 on which eye makeup 104 is disposed, as shown in FIGS. 1B and 1C. In this regard, the bristles 108 are configured to provide a visual indication to a user than the system 100 is removing eye makeup 104 from the region of the eye.

The illustrated system 100 includes a wiper 120 slideably disposed about the support member 118. The wiper 120 is configured to remove eye makeup 104 and formulation 102 from the brush 106. In FIG. 1A, the wiper 120 is disposed about the support member 118 in a first configuration, and distally from the bristles 108. In FIG. 1B, wiper 120 is shown in a second configuration disposed adjacent to the bristles 108, in which the wiper 120 is partially inverted as the wiper fingers 128 of the wiper 120 are pressed against and catch on the plurality of bristles 108. In FIG. 1C, the wiper 120 is shown in a third, inverted configuration in which the wiper fingers 128 are shown scraping eye makeup 104 from the bristles 108. Therefore, in some embodiments eye makeup 104 is being removed from the plurality of bristles 112 as the wiper fingers 128 scrape the eye makeup 104 from the bristles 108 due to the contrasting colors between the eye makeup 104 and the bristles 108. In this regard, the system 100 is configured to provide a visual signal to the user that eye makeup 104 has been removed from the region of the eye and, once the eye makeup 104 has been transferred from the bristles 108 to the wiper 120, that it has also been removed from the plurality of bristles with the wiper 120.

The formulation 102 and eye makeup 104 disposed on the wiper 120 can be removed from the wiper 120 with, for example, water and/or tissue paper, such that the wiper 120 and brush 106 may be used to apply formulation 102 to and remove eye makeup 104 from the region of the eye.

Figure 2A:
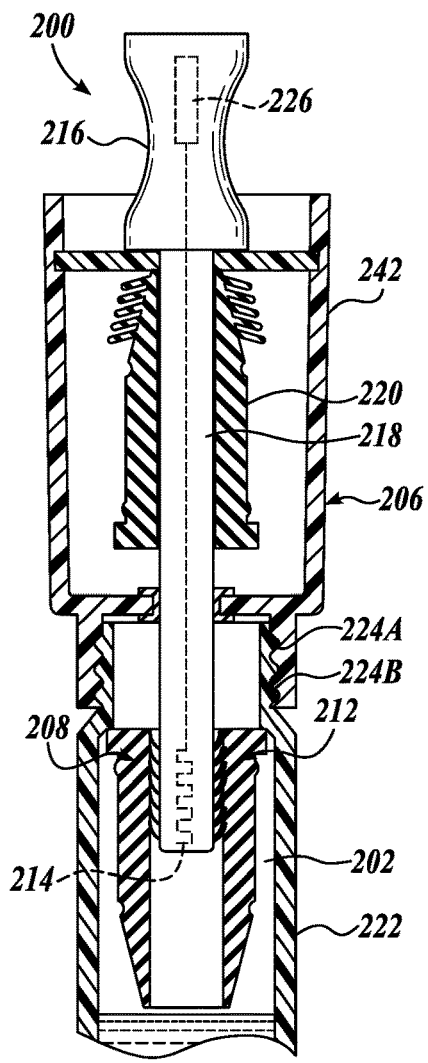
FIGS. 2A-2C are cross-sectional views of another system in accordance with an embodiment of the present technology.
Figure 2B:
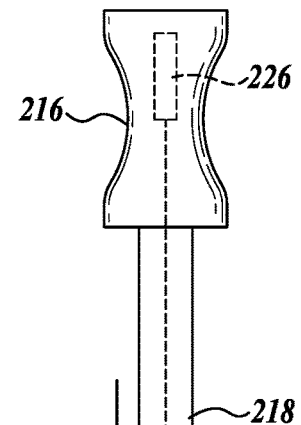
Figure 2B:
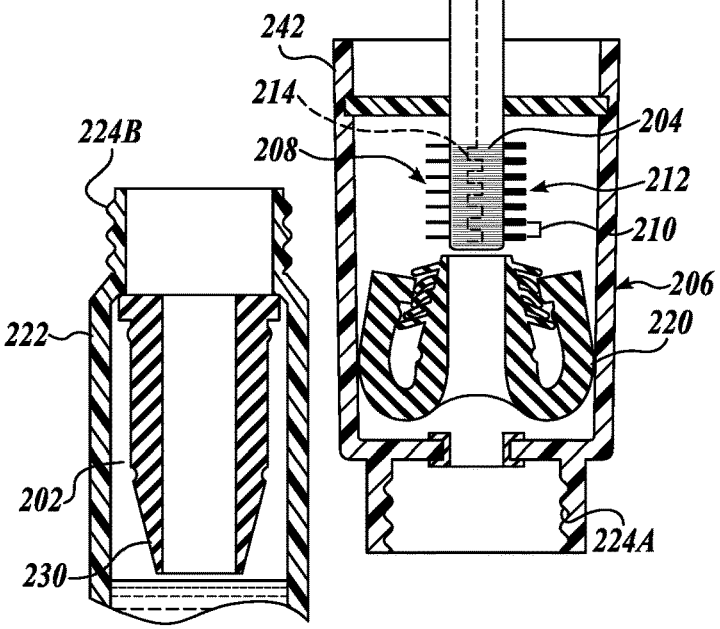
Figure 2C:
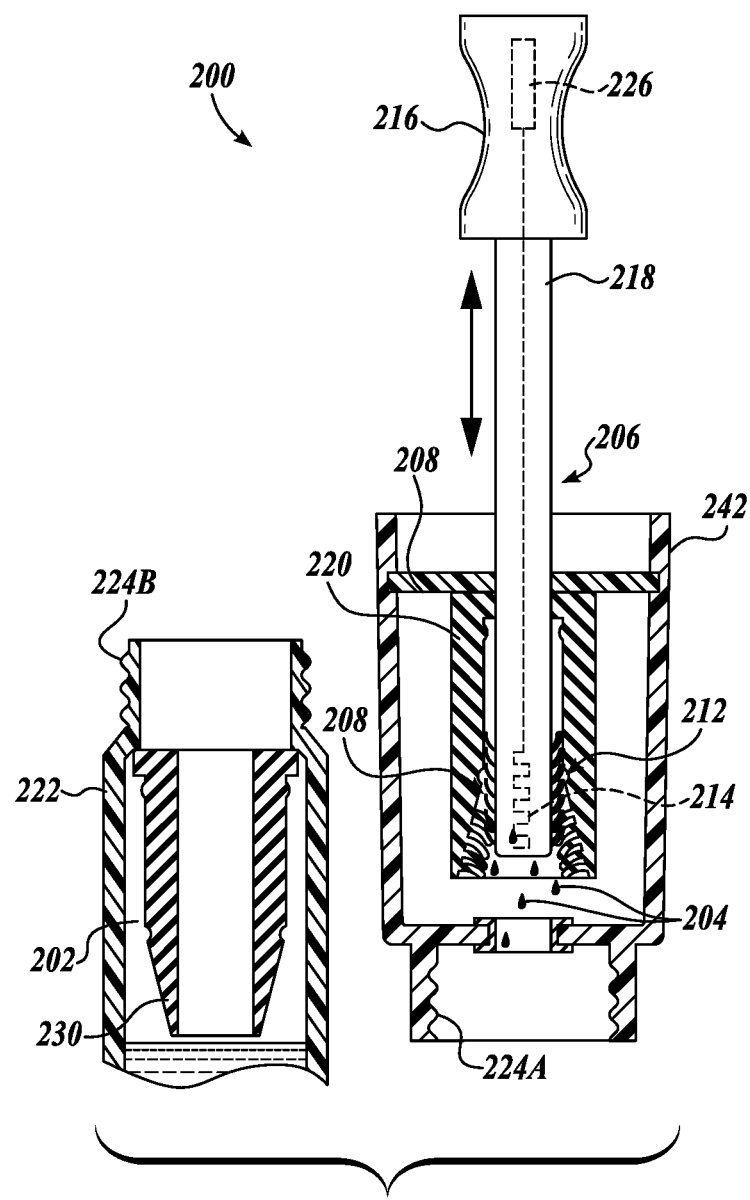

A system 200, in accordance with an embodiment of the disclosure, including two or more pluralities of bristles 208 and 212 will now be described. In that regard, attention is directed to FIGS. 2A-2C illustrating a system 200 in accordance with an embodiment of the disclosure. As shown, system 200 includes a formulation 202 for removing eye makeup 204 from a region of an eye; and a brush 206 including pluralities of bristles 208 and 212 shaped to apply the formulation 202 to the region of the eye and remove the eye makeup 204 from the region of the eye, respectively. The brush 206 includes a handle portion 216 configured to be grasped by a hand; and a support member 218 extending between the handle portion 216 and the pluralities of bristles 208 and 212.

The brush 206 includes a first plurality of bristles 208 shaped to apply the formulation 202 to the region of the eye and a second plurality of bristles 212 shaped to remove the eye makeup 204 from the region of the eye. In this regard, the first plurality of bristles 208 may be shaped to apply the formulation 202, such as by spreading, to the region of the eye, such as eyelashes. Correspondingly, the second plurality of bristles 212 may be configured to remove the formulation 202 and eye makeup 204 from the region of the eye, such as by brushing the formulation 202 and the eye makeup 204 through eyelashes.

In an embodiment, a bristle space 210 between two neighboring bristles of the second plurality of bristles 212 corresponds to a lash space between eyelashes of the eye. In an embodiment, a size of the bristle space 210 is an integer multiple of a size of the lash space. In this regard, the second plurality of bristles 212 is configured to separate neighboring eyelashes, such as by interdigitating bristles of the second plurality of bristles 212 between neighboring eyelashes. As the second plurality of bristles 212 is applied to the separated neighboring eyelashes, the eye makeup 204 and formulation 202 may be more easily and efficiently removed than if the eyelashes were, for example, clumped together due to the formulation 202 and eye makeup 204.

In an embodiment, the first plurality of bristles 208 has a first stiffness and the second plurality of bristles 212 has a second stiffness greater than the first stiffness. With softer bristles, the first plurality of bristles 208 may bend or deflect when pressed against, for example, eyelashes and, in this regard, they are suitable to apply the formulation 202 to the eyelashes. Correspondingly, the second plurality of bristles 212, having a relatively higher stiffness, may not bend or deflect when pressed against eyelashes. In this regard, they are suitable, for example, to separate eyelashes clumped together by formulation 202 and eye makeup 204 and brush out the eye makeup 204 and formulation 202 disposed on the eye lashes. Such separation may be suitable to remove the formulation 202 and eye makeup 204 from the eyelashes.

Illustrated system 200 includes a wiper 220 slideably disposed about the support member 218, and configured to remove eye makeup 204 from the brush 206. In the illustrated embodiment, a wiper portion 242 of the handle portion 216 is slideably disposed about the support member 218 and includes a wiper 220 configured to remove the eye makeup 204 from the brush 206. In FIG. 2A, the wiper portion 242 is shown slideably disposed about the support member 218.

In FIG. 2B, the bristles 208 enter the wiper portion 242 and partially invert the wiper 220 as the pluralities of bristles 208 and 212 contact the fingers 228 of the wiper 220. As shown in FIG. 2C, the wiper 220 is in an inverted configuration in which the fingers 228 of the wiper 220 scrape or otherwise remove eye makeup 204 from the pluralities of bristles 208 and 212 of the brush 206.

In the illustrated embodiment, the system 200 includes a formulation reservoir 222 in which the formulation 202 is disposed to receive the brush 206, such as from the pluralities of bristles 208 and 212. As shown, the formulation reservoir 222 is configured to cooperatively couple with the handle portion 216, such as to securely retain the formulation 202 when cooperatively coupled. In the illustrated embodiment, the brush 206 and formulation reservoir 222 are shown to include threads 224A and 224B, respectively, configured to cooperatively couple.

If not removed from the brush 206, excess formulation 202 may cause clumping of eyelashes and/or get into eyes of a user when applied to the region of the eye. In this regard, the formulation reservoir 222 further includes a formulation wiper 230 configured to remove excess formulation 202 from the brush 206 as it is removed from the formulation reservoir 222.

Illustrated system 200 is shown to include a heating element 214 disposed adjacent to the pluralities of bristles 208 and 212 and configured to heat the pluralities of bristles 208 and 212. As discussed further herein with respect to FIG. 4, such a heating element 214 is suitable to heat the pluralities of bristles 208 and 212 above a phase-change temperature of a phase-change material of an eye makeup 204. As shown, heating element 214 is operatively coupled to power source 226, where power source 226 is suitable to provide electrical power to heat the pluralities of bristles 208 and 212. In this regard, the heating element 214 is suitable to remove such an eye makeup 204 including a phase-change material from the region of the eye by heating the eye makeup 204 above the phase-change temperature and inducing phase change in the eye makeup 204 from, for example, solid to liquid.

As shown, the formulation 202 and eye makeup 204 that is removed from the brush 206 are disposed in the wiper portion 242 of the handle portion 216. In this regard, a user can use the system 200 to remove eye makeup 204 from a region of an eye and clean the brush 206 in a manner suitable to retain the formulation 202 and eye makeup 204 removed from the brush 206 inside the system 200. In this regard, the system 200 is suitable to be used where a user may not have to clean the brush 206, such as by rinsing with water, before placing the brush 206 back into the formulation 202.

Figure 3A:
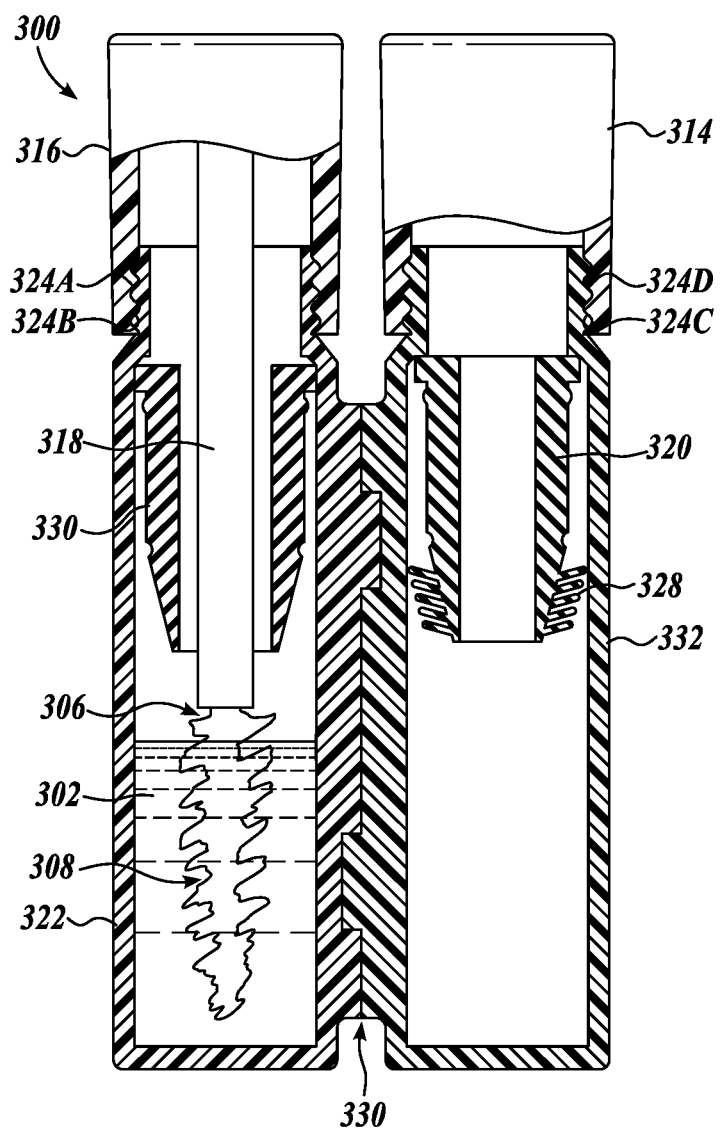
FIGS. 3A-3C are cross-sectional views of another system in accordance with an embodiment of the present technology.
Figure 3B:
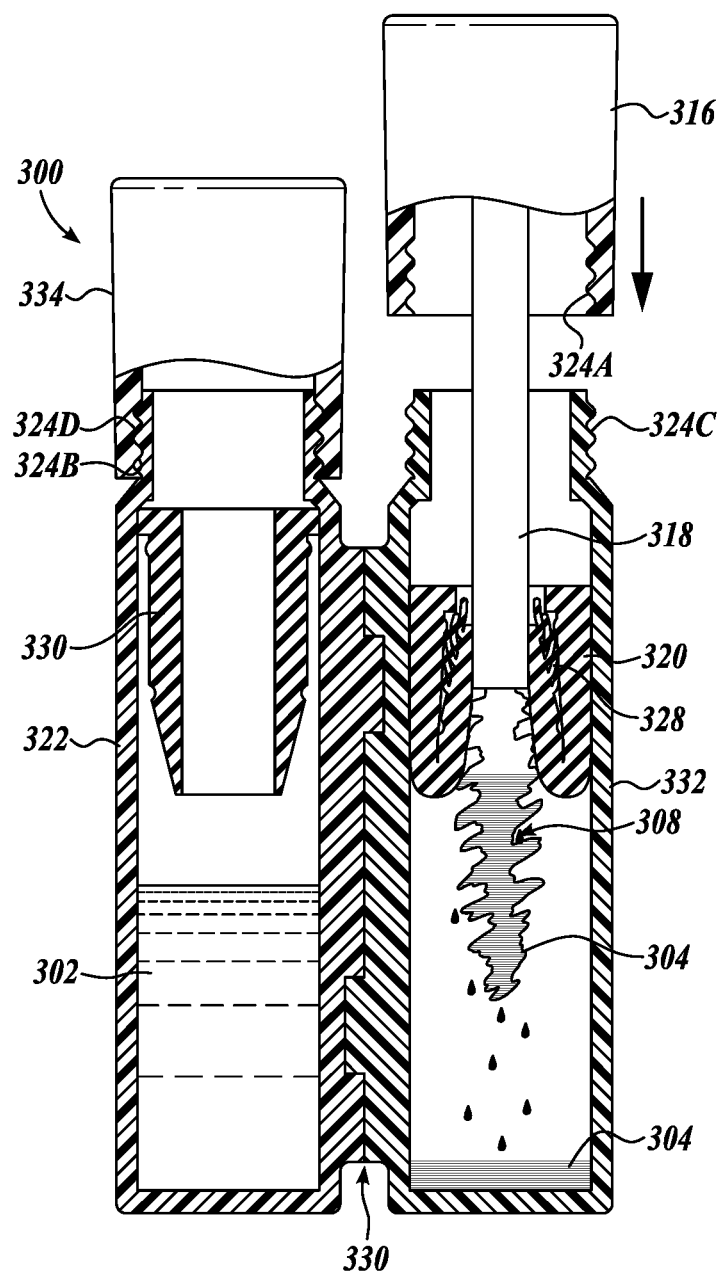
Figure 3C:
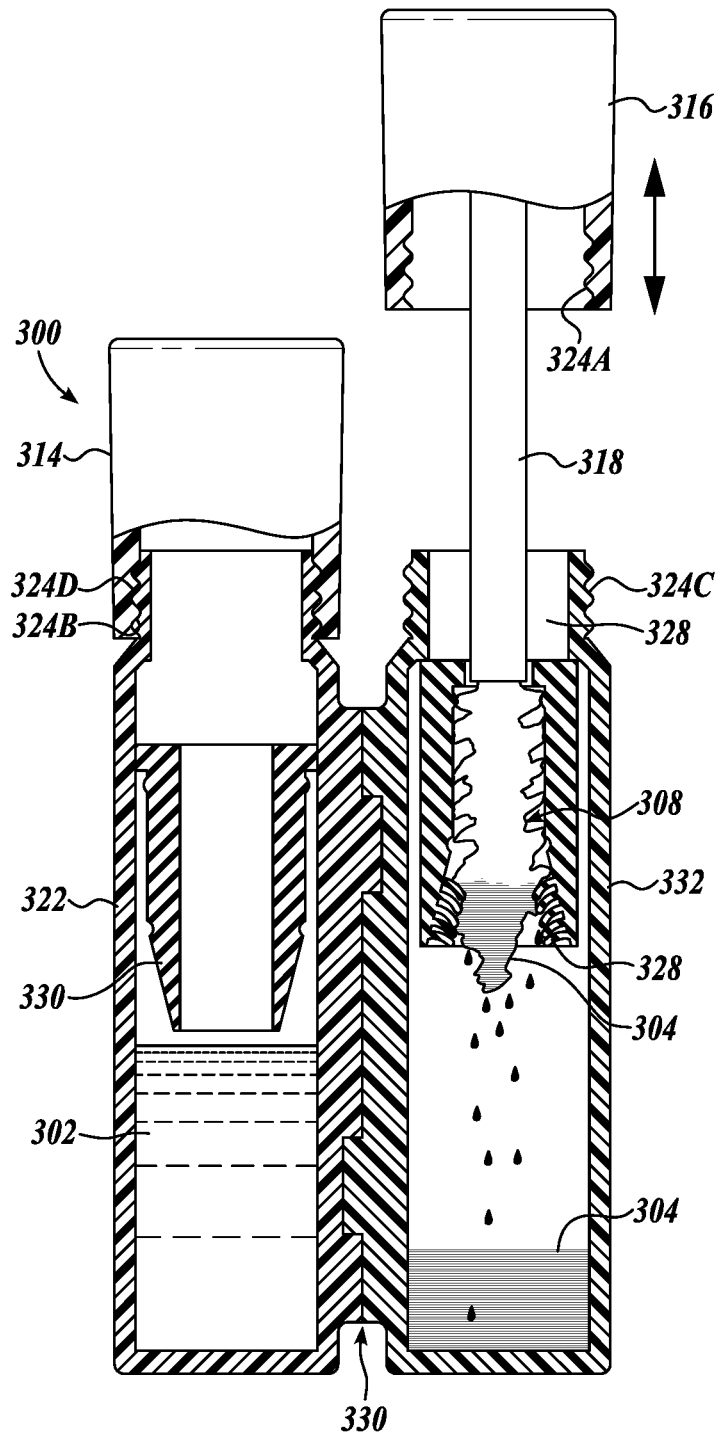

An embodiment of a system 300 including a formulation reservoir 322 and a waste reservoir 332 will now be described. FIGS. 3A-3C are views in cross-section of a system 300 in accordance with an embodiment of the disclosure. As shown, the system 300 includes a formulation 302 for removing eye makeup 304 from a region of an eye; and a brush 306 including a plurality of bristles 308 shaped to apply the formulation 302 to the region of the eye. The bristles 306 may also be configured to remove the eye makeup from the region of the eye. The brush 306 includes a handle portion 316 configured to be grasped by a hand; and a support member 318 extending between the handle portion 316 and the bristles 308. A wiper 320 is also shown disposed within the waste reservoir 332 configured to slideably receive the support member 318 and plurality of bristles 308. As discussed further herein, the wiper 320 is configured to remove eye makeup 304 from the brush 306.

The formulation 302 is disposed in a formulation reservoir 322. In FIG. 3A, the brush 306 is received by the formulation reservoir 322. In the illustrated embodiment, the bristles 308 are shown submerged in the formulation 302. In this regard, as the brush 306 is removed from the formulation reservoir 322, the bristles 308, for example, are coated with the formulation 302 for application to a region of an eye, such as eyelashes and/or eyelids. The formulation reservoir 322 is further shown to include a formulation wiper 330 shaped to receive a portion of the brush 306 including the bristles 308. The formulation wiper 330 is configured to remove excess formulation 302 from the bristles 308 such that an amount of the formulation 302 that is applied to the region of the eye is suitable to, for example, avoid clumping of eyelashes, or the formulation 302 dripping into eyes after it has been applied to the region of the eye. Such a formulation wiper 330 is particularly useful in embodiments where the formulation 302 is a gel, distribution, or other solid or semi-solid formulation that, for example, tends to clump on the bristles 308.

Illustrated system 300 further includes waste reservoir 332. The waste reservoir 332 is configured to receive the brush 306, such as after the brush 306 has been used to remove the eye makeup 304 and formulation 302 from the region of the eye. As shown in FIG. 3B, as brush 306 is moved within the wiper 320 along the support member 318, the fingers 328 of the wiper 320 are pressed against the bristles 308. As a result, the wiper 320 begins to invert. As the plurality of bristles 308 is translated farther through the wiper 320, the wiper 320 inverts further, scraping the fingers 328 along the bristles 308 to remove formulation 302 and eye makeup 304 from the bristles 308, as illustrated in FIG. 3C. In an embodiment, a color of the bristles 308 is different from a color of the eye makeup 304. In an embodiment, the bristles 308 are optically transmissive. In this regard, the system 300 is configured to provide a visual indication that eye makeup 304 has been removed from the region of the eye and removed from the bristles 308, as shown in FIGS. 3B and 3C.

In some embodiments, such waste formulation 302 and eye makeup 304 are received by the waste reservoir 332. By disposing of such waste in the waste reservoir 332, a user may remove eye makeup 304 from a region of the eye and clean the brush 306 while keeping waste contained within the system 300. In this regard, a user may use the system 300 to remove eye makeup 304 without generating uncontained waste formulation and eye makeup 304, which might otherwise stain clothing, bags, and the like. Such features may be particularly useful when, for example, removing eye makeup 304 while away from home where disposal of waste eye makeup 304 and formulation 302 may otherwise be challenging.

As shown, the waste reservoir 332 is coupled to the formulation reservoir 322. In the illustrated embodiment, the waste reservoir 332 is cooperatively coupled to the formulation reservoir 322 with interlocking ridges 336. In the regard, the formulation reservoir 322 and waste reservoir 332 are configured to pair together for, for example, on-the-go use and, for example to be uncoupled, for example, when the waste reservoir 332 is full such that it can be emptied without inverting the formulation reservoir 322.

Illustrated formulation reservoir 322 and waste reservoir 332 include threads 324B and 324C, respectively, configured for cooperative coupling with threads 324A and 324D of the handle portion 316 and waste reservoir cap 334, respectively. Accordingly, the system 300 is configured to contain the formulation 302 and waste eye makeup 304 in the formulation reservoir 322 and waste reservoir 332, respectively. In this regard, the system 300 may be placed in a pocket or a bag when not in use without spilling formulation 302 and/or eye makeup 304. In an embodiment, the threads 324A of the handle portion 316 are configured to cooperatively couple with the threads 324C of the waste reservoir 332 and threads 324D of waste reservoir cap 334 are shaped to couple with the threads 324B of the formulation reservoir 322. In this regard, as the plurality of bristles 308 are being cleaned and the waste formulation 302 and eye makeup 304 are being removed from the bristles 308 in to the waste reservoir 332, the waste reservoir cap 334 can be cooperatively coupled to the formulation reservoir 322 such that formulation 302 is not spilled from the formulation reservoir 322, such as during manipulation of the system 300.

Systems Including a Brush Having a Hollow Support Member

In an embodiment, the systems of the present technology include application portions, such as brushes, coupled to hollow support members in fluid communication with a fluid reservoir carried by a handle portion. In that regard, attention is directed to FIGS. 5A-5D illustrating a system 500, in accordance with an embodiment of the disclosure.

The illustrated system 500 includes a handle portion 516 configured to be grasped by a hand, an application portion 506 for applying a formulation 502 to a region of an eye, and a support member 518 extending between the handle portion 516 and the application portion 506. The application portion 506, shown here as a brush, includes pluralities of bristles 508 and 512 shaped to apply the formulation 502, and an aperture 534 among the pluralities of bristles 508 and 512. As shown, the handle portion 516 also defines a formulation reservoir 522 that carries a formulation 502 for removing eye makeup 504 from a region of an eye. Further, the support member 518 defines a lumen 536 in fluid communication with the formulation reservoir 522 and the aperture 534. In this regard, the aperture 534 is configured to supply the formulation 502 to the application portion 506 including the pluralities of bristles 508 and 512. Such formulation 502 applied to the pluralities of bristles 508 and 512 may be suitable for application to the region of the eye to remove eye makeup 504 disposed thereon.

Figure 5A:
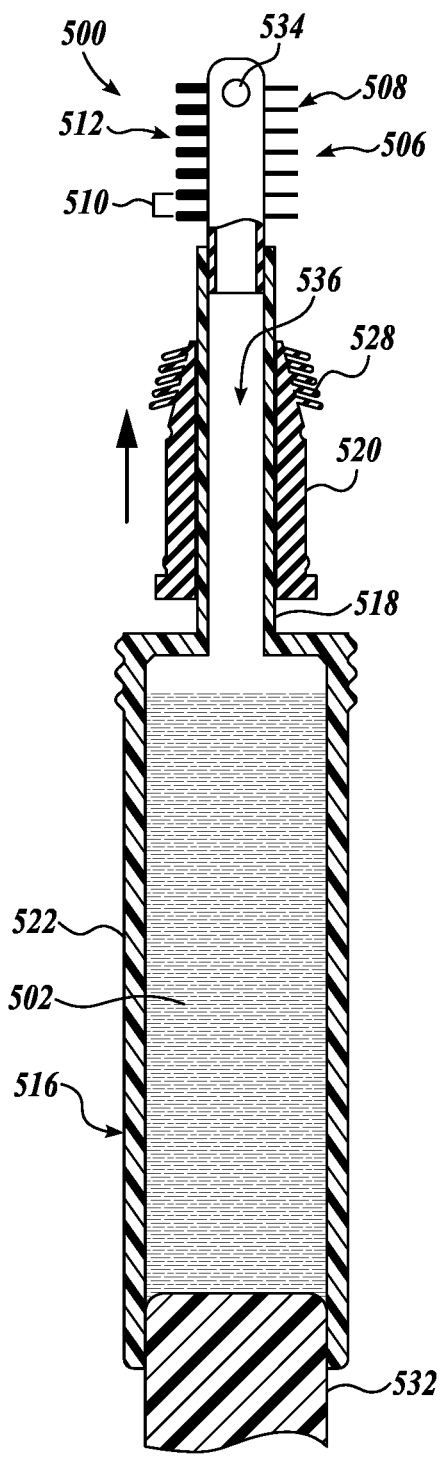
Figure 5B:
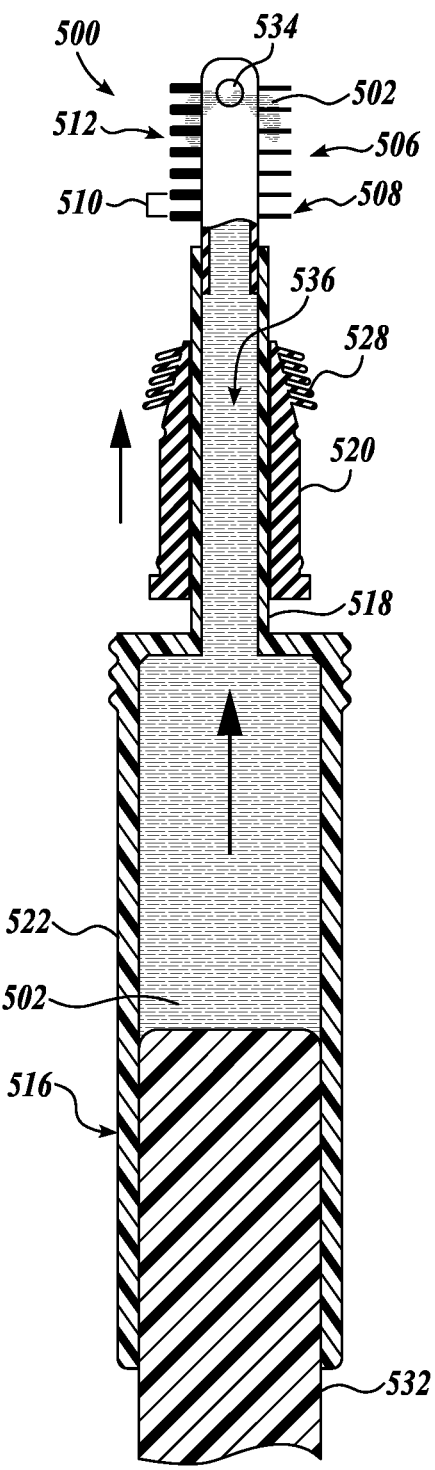

In some embodiments, the system 500 includes a pump 532 configured to dispense the formulation 502 from the formulation reservoir 522 through the lumen 536, out of the aperture 534, and onto the pluralities of bristles 508 and 512. As shown in FIG. 5A, the pump 532 is in a first position with the formulation 502 carried by the formulation reservoir 522. Upon actuation of the pump 532, such as by pressing the pump 532 with a finger, the pump 532 extends farther into the formulation reservoir 522 to a second position, as shown in FIG. 5B. Likewise, upon actuation of the pump 532, the formulation 502 is urged through the lumen 536 of the support member 518, out of the aperture 534, and onto the pluralities of bristles 508 and 512. In this regard, the formulation 502 may be applied to the application portion 506 through actuation of the pump 532. While the illustrated pump 532 is shown to include a pressable piston slideably disposed within a cylinder of the formulation reservoir 522, it will be understood that other pumps, such as pneumatic pumps, peristaltic pumps, syringe pumps, and the like, are possible.

As discussed above, formulations of the present disclosure are suitable to remove eye makeup 504 from a region of an eye, such as by application of the formulation 502 to the region of the eye with the application portion 506. In an embodiment, the formulation 502 comprises a surfactant solution. In an embodiment, the formulation 502 comprises a biphasic distribution of an oil and a surfactant solution suitable to remove, for example, waterproof mascara.

The application portion 506 of the illustrated system 500 includes a first plurality of bristles 508 and a second plurality of bristles 512. In an embodiment, the first plurality of bristles 508 is shaped to apply the formulation 502 to the region of the eye and the second plurality of bristles 512 is shaped to remove the eye makeup 504 from the region of the eye. In that regard, the first plurality of bristles 508 may have a first stiffness and the second plurality of bristles 512 may have a second stiffness greater than the first stiffness. In an embodiment, a bristle space 510 between two neighboring bristles of the second plurality of bristles 512 corresponds to a lash space between eyelashes of the eye. As discussed further herein with respect to FIGS. 2A-2C, such a spacing is suitable to separate eyelashes of an eye, particularly, where a size of the bristle space 510 is an integer multiple of a size of the lash space.

The system 500 further includes a wiper 520 slideably disposed about the support member 518. The wiper 520 is configured to remove eye makeup 504 from the pluralities of bristles 508 and 512. As shown in FIG. 5C, as the wiper 520 is moved along the support member 518 toward the pluralities of bristles 508 and 512, the fingers 528 of the wiper 520 catch on the pluralities of bristles 508 and 512 causing the wiper 520 to invert. In FIG. 5D, the wiper 520 is shown fully inverted with the fingers 528 scraping the eye makeup 504 from the pluralities of bristles 508 and 512. In this regard, the wiper 520 is suitable to remove eye makeup 504 from the pluralities of bristles 508 and 512 after the pluralities of bristles 508 and 512 have been used to remove the eye makeup 504 from the region of the eye.

Figures 6A, 6B, 6C:
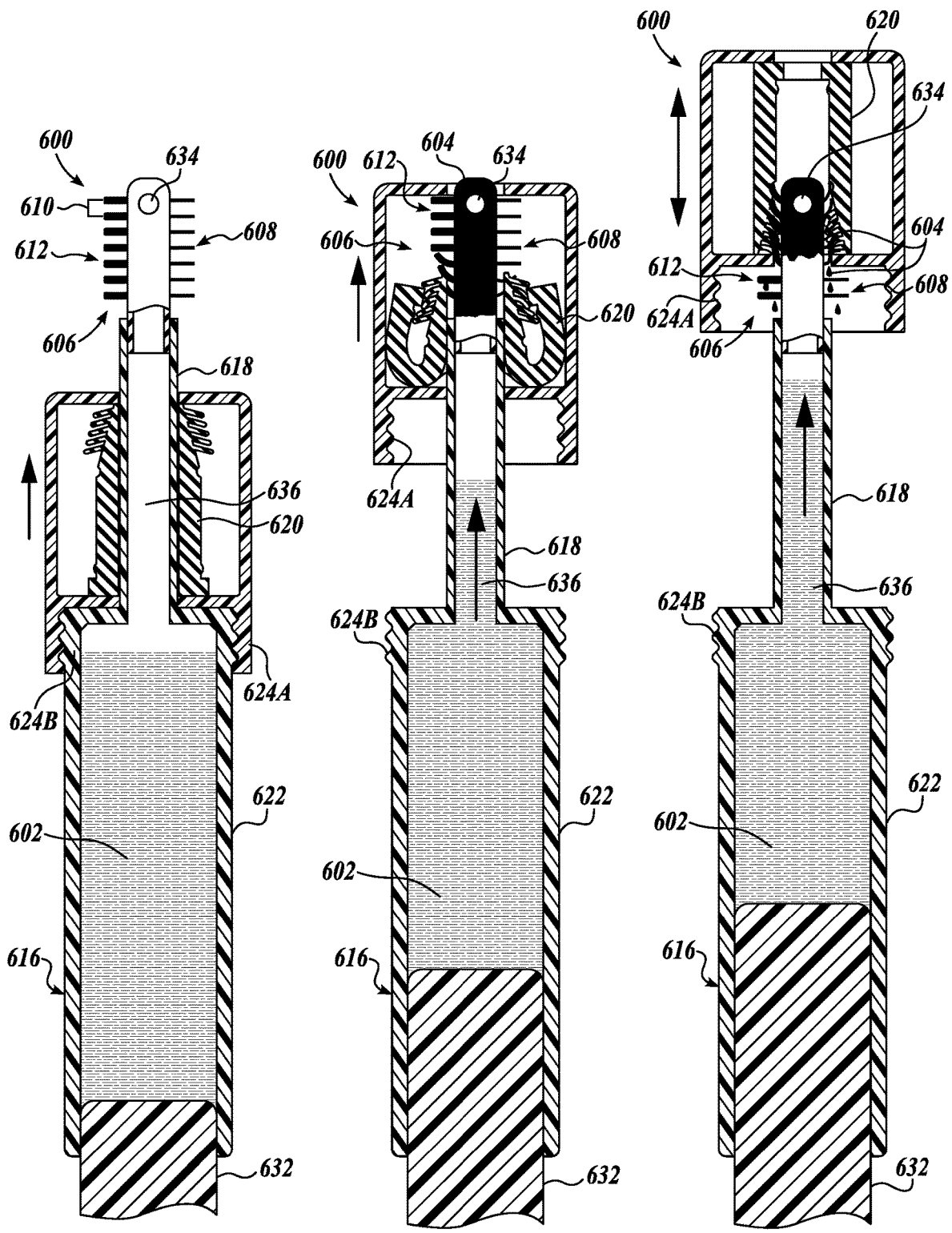
FIGS. 6A-6C are cross-sectional views of another system, in accordance with an embodiment of the disclosure.

In an embodiment, the systems of the present disclosure include a handle portion, an application portion, a support member extending between the handle portion and the application portion, and a wiper portion cooperatively coupleable to the handle portion. In that regard, attention is directed to FIGS. 6A-6C illustrating a system 600 according to an embodiment of the disclosure.

Illustrated system 600 includes a handle portion 616 configured to be grasped by a hand and defining a formulation reservoir 622 that carries a formulation 602 for removing eye makeup 604 from a region of an eye; an application portion 606 including pluralities of bristles 608 and 612 shaped to apply the formulation 602 to the region of the eye and an aperture 634; and a support member 618 extending between the handle portion 616 and the application portion 606. As shown, the support member 618 defines a lumen 636 in fluid communication with the formulation reservoir 622 and the aperture 634. As discussed further herein with respect to FIGS. 5A-5D, the lumen 636 and aperture 634 are suitable to provide fluid communication with the fluid reservoir. In this regard, the formulation 602 may be applied to the pluralities of bristles 608 and 612, such as through actuation of the pump 632.

The application portion 606 includes a first plurality of bristles 608 configured to apply the formulation 602 to the region of the eye and a second plurality of bristles 612 configured to remove makeup from the region of the eye. As discussed above, in an embodiment, a bristle space 610 between two neighboring bristles of the second plurality of bristles 612 corresponds to a lash space between eyelashes of the eye, such as where a size of the bristle space 610 is an integer multiple of a size of the lash space. In this regard, the formulation 602 may be applied to the region of the eye and eye makeup 604 may be removed therefrom.

As above, the system 600 includes a wiper 620 slideably disposed about the support member 618, configured to remove eye makeup 604 from the plurality of bristles. In the illustrated embodiment, the wiper 620 is disposed in a wiper portion 642. The wiper portion 642 is configured to cooperatively couple to the formulation reservoir 622, such as through threads 624A and 624 B. By cooperatively coupling the wiper portion 642 to the formulation reservoir 622, the wiper 620 is prevented from inadvertently interfering with the application portion 606, such as during application of the formulation 602 to and/or removal of eye makeup 604 from the region of the eye. Further, as shown, the wiper portion 642 encloses the wiper 620, such that the wiper 620 may be used to remove eye makeup 604 from the application portion 606 without a user touching the wiper 620 or a soiled application portion 606 thereby, for example, not dirtying hands. Likewise, eye makeup 604 and waste formulation 602 removed from the application portion 606 are contained within the wiper portion 642 as it is removed from the application portion 606, as shown in FIGS. 6B and 6C, because the wiper portion 642 encloses the wiper 620.

Figure 7A:
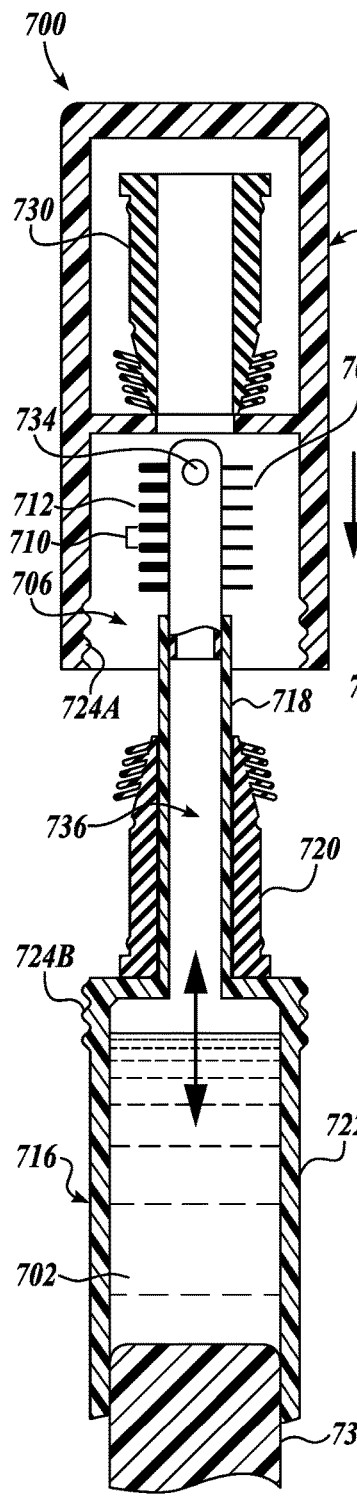
FIGS. 7A-7C are cross-sectional views of another system, in accordance with an embodiment of the disclosure.
Figure 7B:
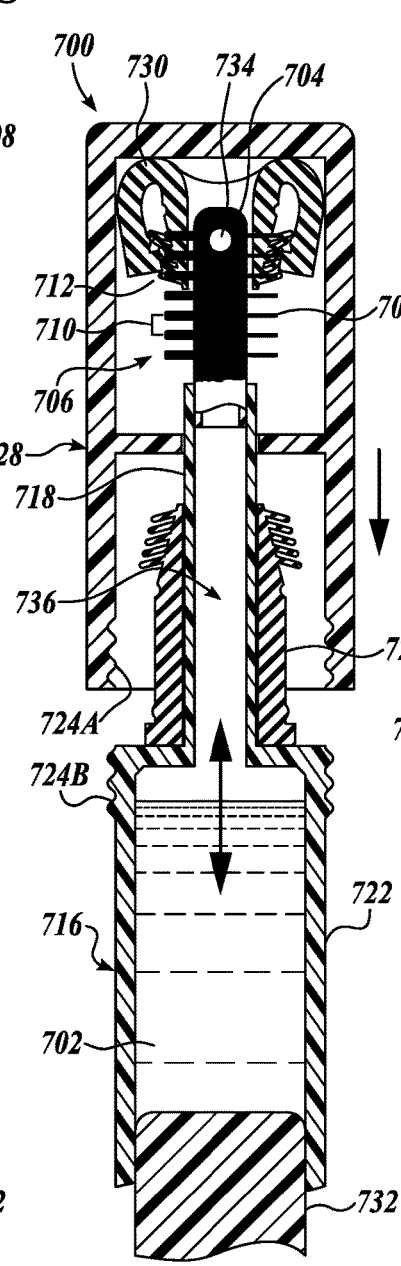
Figure 7C:
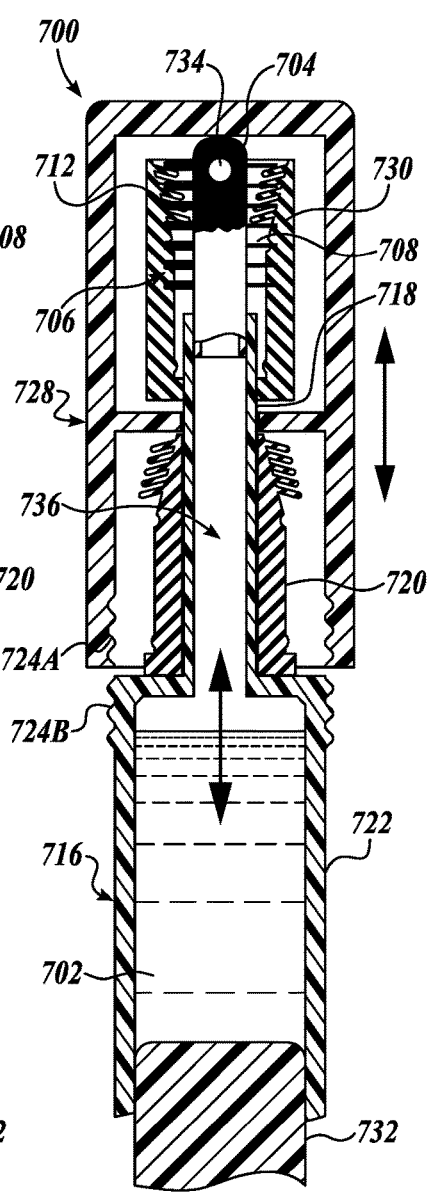

In an embodiment, the systems of the present disclosure include a cap shaped to cooperatively couple with a handle portion to enclose a plurality of bristles of an application portion. In that regard, attention is directed to FIGS. 7A-7C illustrating a system 700, according to an embodiment of the disclosure.

Illustrated system 700 includes a handle portion 716 configured to be grasped by a hand and defining a formulation reservoir 722 that carries a formulation 702 for removing eye makeup 704 from a region of an eye; an application portion 706 including pluralities of bristles 708 and 712 shaped to apply the formulation 702 to the region of the eye; and an aperture 734; and a support member 718 extending between the handle portion 716 and the application portion 706, the support member 718 defining a lumen 736 in fluid communication with the formulation reservoir 722 and the aperture 734.

Support member 718 defines a lumen 736 in fluid communication with the formulation reservoir 722 and the aperture 734. As discussed further herein with respect to FIGS. 5A-5D, the lumen 736 and aperture 734 are suitable to provide formulation 702 to the pluralities of bristles 708 and 712, such as through actuation of the pump 732.

Application portion 706 includes a first plurality of bristles 708 configured to apply the formulation 702 to the region of the eye and a second plurality of bristles 712 configured to remove eye makeup 704 from the region of the eye. As discussed above, in an embodiment, a bristle space 710 between two neighboring bristles of the second plurality of bristles 712 corresponds to a lash space between eyelashes of the eye, such as where a size of the bristle space 710 is an integer multiple of a size of the lash space.

As above, the system 700 includes a cap 728 shaped to cooperatively couple with the handle portion 716. As shown, the cap 728 is configured to receive the application portion 706 and enclose the pluralities of bristles 708 and 712 when the cap 728 is cooperatively coupled to the handle portion 716 with threads 724A and 724 B. In this regard, the cap 728 is configured to cover the application portion 706 preventing formulation 702 and eye makeup 704 from dirtying, for example, hands, clothing, and the like that may come in contact with the application portion 706.

The cap 728 further includes a cap wiper 730 disposed within the cap 728. The cap 728 is configured to receive the application portion 706. In this regard, the cap wiper 730 inverts when contacted by the application portion 706 to scrape the eye makeup 704 and formulation 702 from the application portion 706, as shown in FIGS. 7B and 7C. Further, such eye makeup 704 and formulation 702 removed from the application portion 706 is retained within the cap 728 as the cap 728 substantially encloses the cap wiper 730.

The system 700 further includes a support member wiper 720 slideably disposed on the support member 718. Support member wiper 720 is suitable for removing, for example, excess formulation 702 from the application portion 706, such as to avoid clumping of formulation 702 when applied to the region of the eye.

Cosmetic Kits

In another aspect, the present disclosure provides a cosmetic kit for application and removal of eye makeup from a region of an eye. In an embodiment, the cosmetic kits include a system for removing eye makeup from a region of the eye and eye makeup for application to the region of the eye.

Figure 4:
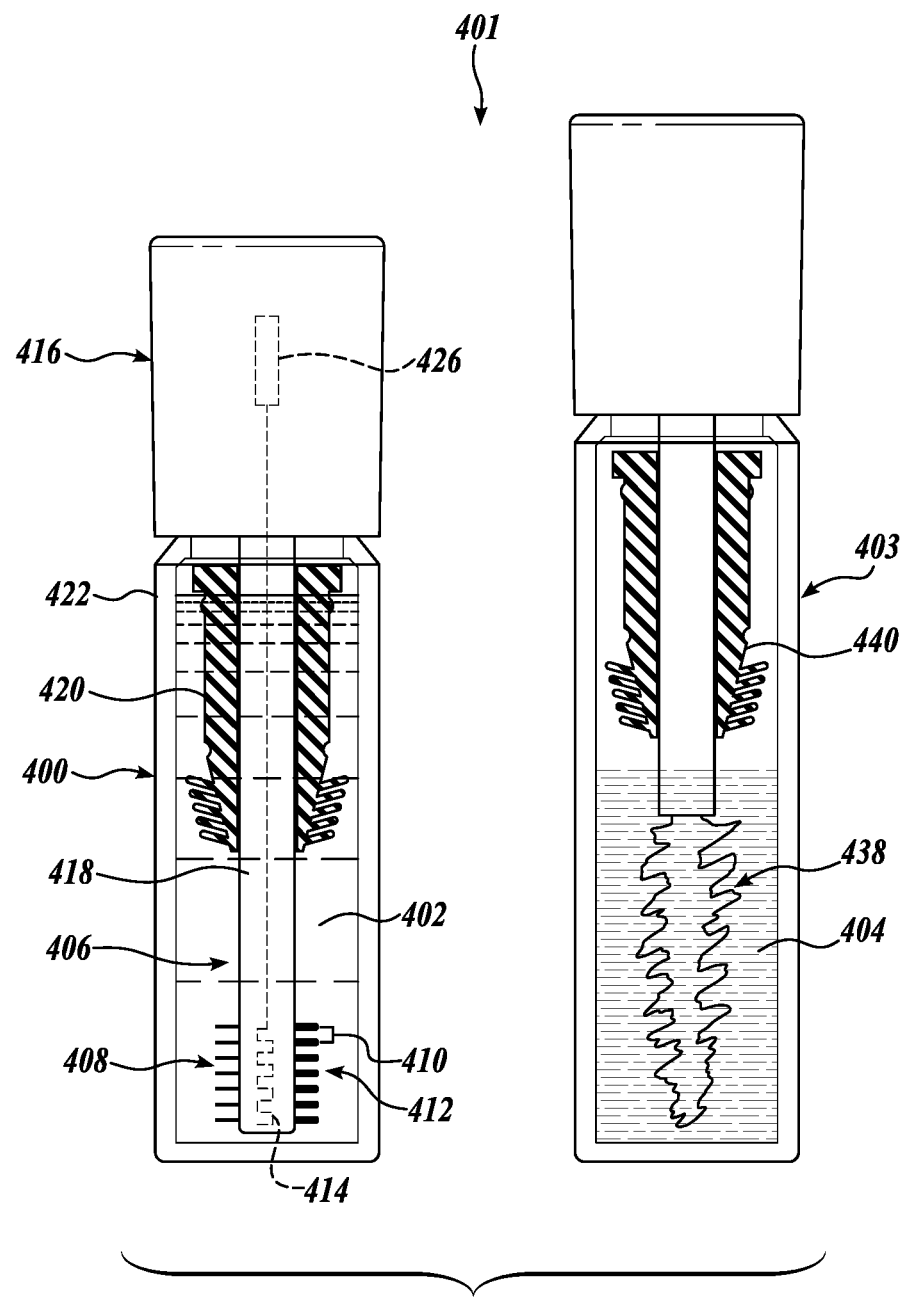
FIG. 4 is a cross-sectional view of a cosmetic kit, in accordance with an embodiment of the present technology.

Cosmetic Kits Including Eye Makeup and Systems Including a Brush and a Formulation for Removing the Eye Makeup In that regard, attention is directed to FIG. 4, in which a cosmetic kit 401 according to an embodiment of the disclosure is illustrated. FIG. 4 is a view in cross-section of a cosmetic kit 401 shown to include eye makeup 404 for application onto a region of an eye; and a system 400 for removing the eye makeup 404 from the region of the eye.

As shown, the cosmetic kit 401 includes an eye makeup reservoir 403 carrying the eye makeup 404 and an applicator 438 for applying the eye makeup 404 to a portion of the eye. In the illustrated embodiment, the eye makeup 404 is mascara 404 for application to eyelashes of the eye and the applicator 438 is a brush 438 configured to apply the mascara 404 to the eyelashes. While mascara 404 is illustrated and discussed further herein, it will be understood that other forms of eye makeup 404, such as eye liner, brow liner, eye shadow, and the like, are encompassed by the cosmetic kit 401 of the present disclosure. The cosmetic kit 401 further includes an eye makeup wiper 440 configured to remove eye makeup 404 from applicator 403.

The system 400 is shown to include a formulation 402 for removing the eye makeup 404 from the region of the eye disposed in formulation reservoir 422; and a brush 406 including a plurality of bristles 408 shaped to apply the formulation 402 to the region of the eye, a handle portion 416 configured to be grasped by a hand, and a support member 418 extending between the bristles 408 and the handle portion 416. As discussed further herein with respect to, for example, FIGS. 1A-1C, the bristles 408 of brush 406 are configured to apply the formulation 402 to, for example, eyelashes of the eye and then used to brush the formulation 402 and eye makeup 404 from the eyelashes.

In the illustrated embodiment, the bristles 408 are a first plurality of bristles 408, and the system 400 further includes a second plurality of bristles 412 shaped to remove the eye makeup 404 from the region of the eye. As discussed further herein with respect to FIGS. 2A-2C, in an embodiment, the second plurality of bristles 412 are configured to separate eyelashes of an eye. In this regard, in an embodiment, a bristle space 410 between two neighboring bristles of the second plurality of bristles 412 corresponds to a lash space between eyelashes of the eye. In an embodiment, a size of the bristle space 410 is an integer multiple of a size of the lash space. By interdigitating with eyelashes, the second plurality of bristles 412 is configured to break up any clumps of formulation 402 and eye makeup 404 and brush formulation 402 and eye makeup 404 from the region of the eye.

As discussed further herein with respect to FIGS. 2A-2C, in an embodiment, the bristles of the second plurality of bristles 412 are stiffer than the bristles of the first plurality of bristles 408. In an embodiment, the first plurality of bristles 408 has a first stiffness and the second plurality of bristles 412 has a second stiffness greater than the first stiffness. In that regard, the first plurality of bristles 408 may have a stiffness suitable to apply the formulation 402 to the region of the eye, whereas the second plurality of bristles 412 have a stiffness suitable to remove the formulation 402 and eye makeup 404 from the region of the eye.

In an embodiment, the formulation 402 includes a surfactant suitable for removing eye makeup 404, such as mascara, from the region of the eye. In an embodiment, the formulation 402 includes a gel including a surfactant. Such a formulation 402 including a gel tends to stay on the region of the eye when applied, rather than, for example, running into an eye. In an embodiment, the eye makeup 404 is a waterproof mascara 404 and the formulation 402 comprises a biphasic distribution of an oil and the surfactant solution suitable to remove the waterproof mascara 404 from the region of the eye.

Illustrated cosmetic kit 401 is shown to further include a wiper 420 slideably disposed about the support member 418, configured to remove eye makeup 404 from the pluralities of bristles 408 and 412, as discussed further herein.

In an embodiment, the eye makeup 404 includes a phase-change material configured to change phases, such as from solid to liquid, in response to a stimulus. In an embodiment, the phase-change material is a sheer-thinning material configured to undergo phase change when contacted by the second plurality of bristles 412. In this regard, as the second plurality of bristles 412 are, for example, applied to the eye makeup 404 disposed on the region of the eye, sheer stress from the second plurality of bristles 412 induces a phase change in the eye makeup 404 suitable to remove the eye makeup 404 from the region of the eye. In an embodiment, the phase-change material has a phase-change temperature above which the eye makeup 404 is a liquid. In an embodiment, the brush 406 further comprises a heating element 414 adjacent to the pluralities of bristles 408 and 412 configured to heat the pluralities of bristles 408 and 412 above the phase-change temperature of the phase-change material. In this regard, as the pluralities of bristles 408 and 412 having a temperature above the phase-change temperature are applied to the eye makeup 404, the eye makeup 404 changes phases from a solid to a liquid and is, thus, easier to remove from the region of the eye. The system 400 further includes a power source 426 operatively coupled to the heating element 414 configured to power the heating element 414.

Cosmetic Kits Including an Application Portion and a Hollow Support Member

Figure 8:
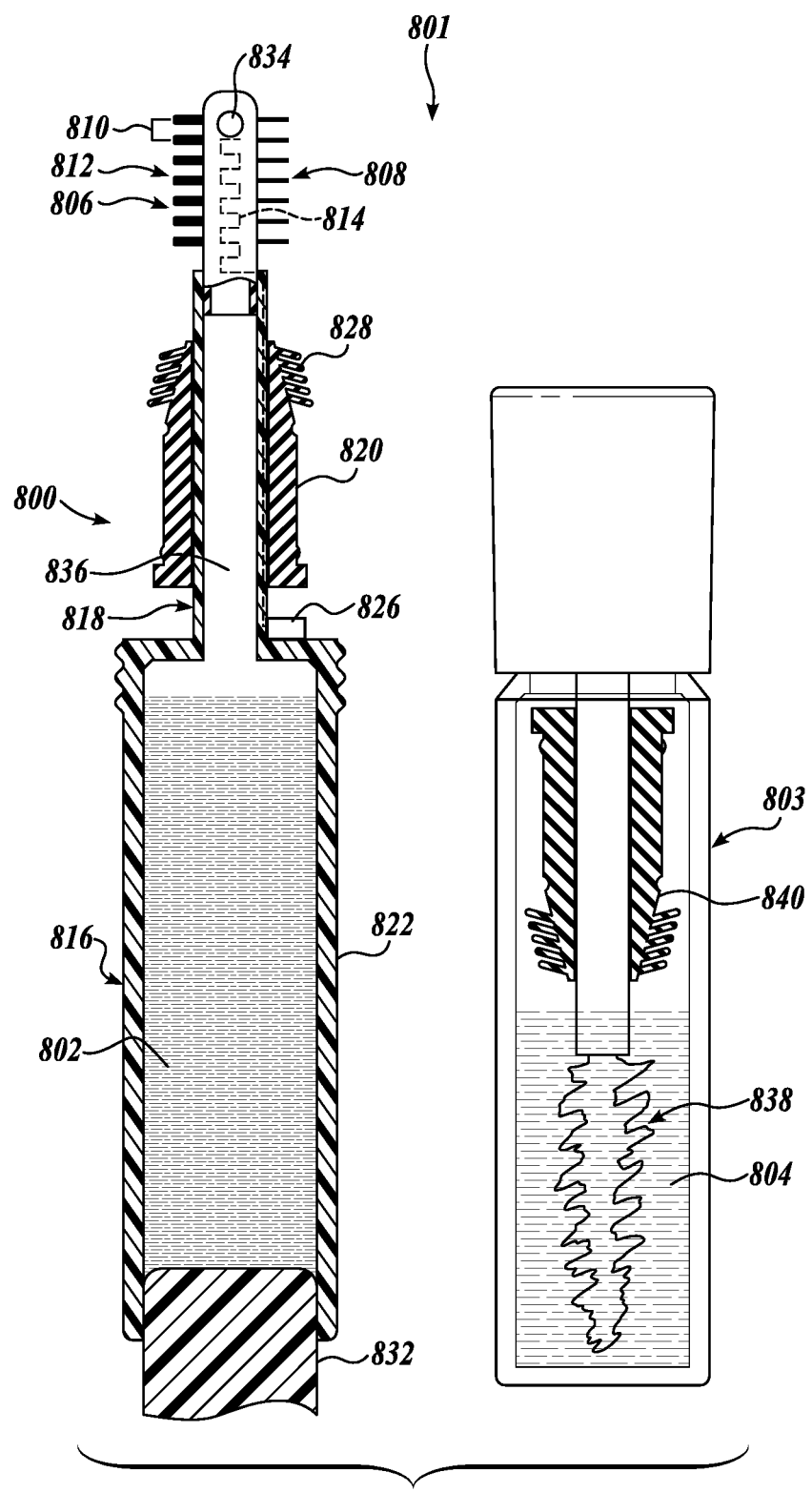
FIG. 8 is a cross-sectional view of another cosmetic kit, in accordance with an embodiment of the present technology.

In an embodiment, the cosmetic kits according to the present disclosure include eye makeup for application onto a region of an eye; and a system for eye makeup removal, wherein the system includes an application portion, such as a brush, a hollow support member in fluid communication with a fluid reservoir defined by a handle portion coupled to the support member. In that regard, attention is directed to FIG. 8 illustrating a cosmetic kit 801, in accordance with an embodiment of the disclosure. Illustrated cosmetic kit 801 includes eye makeup 804 for application onto a region of an eye; and a system 800 for eye makeup 804 removal. The eye makeup 804 is shown to be mascara 804 for application to eyelashes of an eye. In an embodiment, the mascara 804 is a waterproof mascara 804. Accordingly, in an embodiment, the formulation 802 of the system 800 is a biphasic distribution of an oil and a surfactant solution configured to remove the waterproof mascara 804 from the eyelashes. In an embodiment, the eye makeup 804 includes a phase-change material. In an embodiment, the phase-change material is a sheer-thinning material configured to undergo a phase change under sheer stress. In this regard, the phase-change material may be configured to undergo the phase change, for example, from solid to liquid, when contacted by one or more of the pluralities of bristles 808 and 812.

In the illustrated embodiment, the cosmetic kit 801 further comprises a makeup reservoir 803 configured to carry the eye makeup 804 and a brush 838 configured for applying the eye makeup 804 to the region of the eye. The cosmetic kit 801 is further shown to include a wiper 840 for wiping excess eye makeup 804 from the brush 838 to avoid clumping of applied eye makeup 804 on the brush 838.

The system 800 is shown to include a handle portion 816 configured to be grasped by a hand and defining a formulation 802 reservoir that carries a formulation 802 for removing the eye makeup 804 from the region of the eye. The support member 818 extends between the handle portion 816 and the application portion 806, which includes the pluralities of bristles 808 and 812 and an aperture 834 disposed among the pluralities of bristles 808 and 812. As shown, the support member 818 defines a lumen 836 in fluid communication with the formulation reservoir 822 and the aperture 834. A wiper 820 is slideably disposed about support member 818 for wiping eye makeup 804 and excess formulation 802 from the application portion 806. As above, the pump 832 is configured to flow the formulation 802 from the formulation reservoir 822, through the lumen 836, and out of the aperture 834 such that a portion of the formulation 802 is applied to the pluralities of bristles 808 and 812. In this regard, the pump 832 may be used to apply the formulation 802 to the pluralities of bristles 808 and 812 for application to the region of the eye. As above, a bristle space 810 between two neighboring bristles of the second plurality of bristles 812 may correspond to a lash space between eyelashes of the eye.

The system 800 is shown to further include a heating element 814 adjacent to the pluralities of bristles 808 and 812 and operatively coupled to a power source 826. Such a heating element 814 may be suitable to heat the pluralities of bristles 808 and 812 above a phase-change temperature of a phase-change material of the eye makeup 804. As above, by heating the pluralities of bristles 808 and 812 above the phase-change temperature, the phase-change material may change phases from, for example, solid to liquid, rendering it easier to remove from the region of the eye.

It should be noted that for purposes of this disclosure, terminology such as "upper," "lower," "vertical," "horizontal," "inwardly," "outwardly," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. The term "about" means plus or minus 5% of the stated value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

While illustrative embodiments have been illustrated and described, it will be appreciated that various changes can be made therein without departing from the spirit and scope of the claimed subject matter.

The embodiments of the invention in which an exclusive property or privilege is claimed are defined as follows:

1. A system for eye makeup removal, the system comprising:
    a formulation disposed in a formulation reservoir and for removing eye makeup from a region of an eye; and
    a brush shaped to be received by the formulation reservoir, the brush including:
        a plurality of bristles shaped to apply the formulation to the region of the eye;
        a handle portion configured to be grasped by a hand; and
        a support member extending between the handle portion and the plurality of bristles;
    a waste reservoir configured to receive the brush and shaped to contain waste formulation and eye makeup; and
    a wiper defining wiper fingers, wherein the wiper is slideably disposed about the support member, and wherein the wiper is configured to invert as the wiper fingers are pressed against the plurality of bristles to remove eye makeup from the brush.

2. The system of claim 1, wherein the plurality of bristles is a first plurality of bristles, the system further comprising a second plurality of bristles shaped to remove the eye makeup from the region of the eye.

3. The system of claim 2, wherein a bristle space between two neighboring bristles of the second plurality of bristles corresponds to a lash space between eyelashes of the eye.

4. The system of claim 3, wherein a size of the bristle space is an integer multiple of a size of the lash space.

5. The system of claim 2, wherein the first plurality of bristles has a first stiffness and the second plurality of bristles has a second stiffness greater than the first stiffness.

6. The system of claim 1, wherein the plurality of bristles are optically transmissive.

7. The system of claim 1, wherein the formulation comprises a surfactant solution.

8. The system of claim 7, wherein the formulation comprises a biphasic distribution of an oil and the surfactant solution.

9. The system of claim 1, wherein the formulation is disposed in a formulation reservoir shaped to receive the brush and to cooperatively couple with the handle portion.

10. A cosmetic kit comprising:
    eye makeup for application onto a region of an eye; and
    a system for removing the eye makeup from the region of the eye, the system including:
        a formulation disposed in a formulation reservoir and for removing the eye makeup from the region of the eye; and
        a brush shaped to be received by the formulation reservoir, the brush including:
            a plurality of bristles shaped to apply the formulation to the region of the eye;
            a handle portion configured to be grasped by a hand; and a support member extending between the handle portion and the plurality of bristles;

a waste reservoir configured to receive the brush and shaped to contain waste formulation and eye makeup; and a wiper defining wiper fingers, wherein the wiper is slideably disposed about the support member, and wherein the wiper is configured to invert as the wiper fingers are pressed against the plurality of bristles to remove eye makeup from the brush.

11. The cosmetic kit of claim 10, wherein the plurality of bristles is a first plurality of bristles, the system further including a second plurality of bristles shaped to remove the eye makeup from the region of the eye.

12. The cosmetic kit of claim 11, wherein a bristle space between two neighboring bristles of the second plurality of bristles corresponds to a lash space between eyelashes of the eye.

13. The cosmetic kit of claim 12, wherein a size of the bristle space is an integer multiple of a size of the lash space.

14. The cosmetic kit of claim 10, wherein the plurality of bristles have a color different than a color of the eye makeup.

15. The cosmetic kit of claim 10, wherein the eye makeup comprises a phase-change material.

16. The cosmetic kit of claim 15, wherein the brush further comprises a heating element adjacent to the plurality of bristles configured to heat the plurality of bristles above a phase-change temperature of the phase-change material.

17. The cosmetic kit of claim 15, wherein the phase-change material is a sheer-thinning material configured to undergo phase change when contacted by the plurality of bristles.

18. The cosmetic kit of claim 10, wherein the formulation comprises a surfactant solution.

19. The cosmetic kit of claim 18, wherein the eye makeup is a waterproof mascara, and wherein the formulation comprises a biphasic distribution of an oil and the surfactant solution.

* * * * *